(12) United States Patent
Aono et al.

(10) Patent No.: US 10,829,057 B2
(45) Date of Patent: Nov. 10, 2020

(54) VEHICULAR DISPLAY SYSTEM

(71) Applicant: Yazaki Corporation, Tokyo (JP)

(72) Inventors: Yuusuke Aono, Shizuoka (JP); Tomohiro Sugiyama, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/400,011

(22) Filed: Apr. 30, 2019

(65) Prior Publication Data

US 2019/0351838 A1    Nov. 21, 2019

(30) Foreign Application Priority Data

May 15, 2018   (JP) ................................. 2018-093628

(51) Int. Cl.
  *B60R 11/02*   (2006.01)
  *B60K 35/00*   (2006.01)
  *B60R 11/00*   (2006.01)

(52) U.S. Cl.
  CPC .......... *B60R 11/0229* (2013.01); *B60K 35/00* (2013.01); *B60R 11/0235* (2013.01); *B60R 11/0252* (2013.01); *B60K 2370/152* (2019.05); *B60K 2370/67* (2019.05); *B60R 2011/0005* (2013.01); *B60R 2011/0087* (2013.01); *B60R 2011/0089* (2013.01); *B60R 2011/0092* (2013.01)

(58) Field of Classification Search
  CPC ............. B60R 11/0229; B60R 11/0235; B60R 11/0252; B60R 2011/0089; B60R 2011/0087; B60R 2011/0005; B60K 2370/67; B60K 2370/152
  See application file for complete search history.

(56) References Cited

U.S. PATENT DOCUMENTS

| | | | |
|---|---|---|---|
| 6,366,672 B1 * | 4/2002 | Tsay .................... | B60R 11/0241 379/446 |
| 9,494,796 B2 * | 11/2016 | Ishibashi ................ | B60K 35/00 |
| 10,464,477 B2 * | 11/2019 | Maeda .................... | B60K 37/02 |
| 10,682,913 B2 * | 6/2020 | Maeda .................... | B60K 37/02 |

(Continued)

FOREIGN PATENT DOCUMENTS

| | | |
|---|---|---|
| JP | 6-199186 A | 7/1994 |
| JP | 2017-144869 A | 8/2017 |

(Continued)

*Primary Examiner* — Eret C McNichols
(74) *Attorney, Agent, or Firm* — Kenealy Vaidya LLP

(57) ABSTRACT

A vehicular display system includes a movable body displaceable between an erect position and a tilted position, a first moving body disposed on the vehicle upper side of the movable body in the erect position, a second moving body disposed on the vehicle lower side of the movable body in the erect position, a drive device that displaces the movable body between the erect position and the tilted position, a guide device that guides the second moving body along the displacement operation of the movable body between the erect position and the tilted position, a display device that allows a user to view vehicle interior display information as if the information were displayed in an information display area of the movable body, and an elastic member that applies an elastic force between the movable body and the drive device.

8 Claims, 13 Drawing Sheets

(56) References Cited

U.S. PATENT DOCUMENTS

| | | | |
|---|---|---|---|
| 2011/0247770 A1 | 10/2011 | Dietzel et al. | |
| 2012/0262868 A1* | 10/2012 | Kato | H04N 5/655 |
| | | | 361/679.21 |
| 2013/0279015 A1* | 10/2013 | Ishibashi | B60K 37/02 |
| | | | 359/630 |
| 2014/0320382 A1* | 10/2014 | Moussa | G02B 27/0149 |
| | | | 345/7 |
| 2015/0323794 A1* | 11/2015 | Mikami | G02B 27/0149 |
| | | | 359/630 |
| 2016/0193923 A1* | 7/2016 | Kim | B60K 37/06 |
| | | | 296/70 |
| 2017/0023177 A1* | 1/2017 | Yomogita | G02B 7/005 |
| 2017/0168300 A1* | 6/2017 | Ohkawa | G02B 27/0149 |
| 2017/0232844 A1* | 8/2017 | Sugiyama | B60K 37/04 |
| | | | 248/27.1 |
| 2017/0232845 A1 | 8/2017 | Sugiyama | |
| 2018/0201204 A1* | 7/2018 | Saitou | G02B 27/0101 |
| 2018/0267310 A1* | 9/2018 | Quiroz de la Mora | |
| | | | G02B 27/0149 |
| 2019/0070960 A1* | 3/2019 | Maeda | B60K 35/00 |

FOREIGN PATENT DOCUMENTS

| | | |
|---|---|---|
| JP | 2017-144870 A | 8/2017 |
| JP | 2017-146190 A | 8/2017 |
| JP | 2019190925 A * | 10/2019 |
| JP | 2019191101 A * | 10/2019 |

* cited by examiner

VEHICULAR DISPLAY SYSTEM

CROSS-REFERENCE TO RELATED APPLICATION(S)

The present application claims priority to and incorporates by reference the entire contents of Japanese Patent Application No. 2018-093628 filed in Japan on May 15, 2018.

BACKGROUND OF THE INVENTION

1. Field of the Invention

The present invention relates to a vehicular display system.

2. Description of the Related Art

Conventionally, vehicle interiors are each provided with a vehicular display system that displays vehicle interior display information (what is provided as visual information to occupants in a vehicle interior). For example, Japanese Patent Application Laid-open Nos. 2017-146190, 2017-144869, and 2017-144870 each disclose a vehicular display system that uses a power source, such as an electric motor, to displace a movable body between an erect position and a tilted position, and displays the vehicle interior display information in an inside area of a frame of the movable body.

When the movable body is displaced from the erect position to the tilted position, the direction of a force applied by transmitted power of the power source is the same as the direction of a force applied by an own weight of the movable body at a point of application of the power. In contrast, when the movable body is displaced from the tilted position to the erect position, the direction of the force applied by the transmitted power of the power source is opposite to the direction of the force applied by the own weight of the movable body at the point of application of the power. Thus, the force applied by the own weight acts against the force applied by the transmitted power. As a result, the load of the power source is higher when the movable body is displaced from the tilted position to the erect position than when the movable body is displaced from the erect position to the tilted position. The difference in the load of the power source caused by the difference in the direction of the displacement increases with increase in the mass of the movable body.

SUMMARY OF THE INVENTION

Accordingly, it is an object of the present invention to provide a vehicular display system capable of reducing the load of the power source.

In order to achieve the above mentioned object, a vehicular display system according to one aspect of the present invention includes a movable body that is displaceable between an erect position in which an information display area is directed toward a user side and a tilted position in which the information display area is brought closer to a horizontal position than the erect position; a first moving body that is disposed on one of a vehicle upper side and a vehicle lower side of the movable body in the erect position, and is configured to move in an integrated manner with the movable body; a second moving body that is disposed on the other of the vehicle upper side and the vehicle lower side of the movable body in the erect position, and is configured to move in an integrated manner with the movable body; a drive device configured to transmit power of a power source to the first moving body via a power transmission device, and to displace the movable body between the erect position and the tilted position while relatively rotating the first moving body about an axis of a first rotary shaft; a guide device configured to guide the second moving body along the displacement operation of the movable body between the erect position and the tilted position while relatively rotating the second moving body about an axis of a second rotary shaft; a display device configured to allow the user to view vehicle interior display information as if the vehicle interior display information were displayed in the information display area; and an elastic member configured to apply an elastic force between the movable body and the drive device, the elastic force being due to the displacement operation of the movable body from the tilted position side to the erect position side.

According to another aspect of the present invention, in the vehicular display system, it is desirable that the elastic member is provided so as to increase the elastic force with increase in an amount of the displacement of the movable body from the erect position toward the tilted position.

According to still another aspect of the present invention, in the vehicular display system, it is desirable that the drive device includes a holding body configured to hold the first moving body in a state relatively rotatable about the axis of the first rotary shaft, and the elastic member is provided so as to apply the elastic force to the first moving body and the holding body in directions opposite to each other along a circle about the axis of the first rotary shaft.

According to still another aspect of the present invention, in the vehicular display system, it is desirable that the elastic member is a torsion coil spring.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Figure 1:
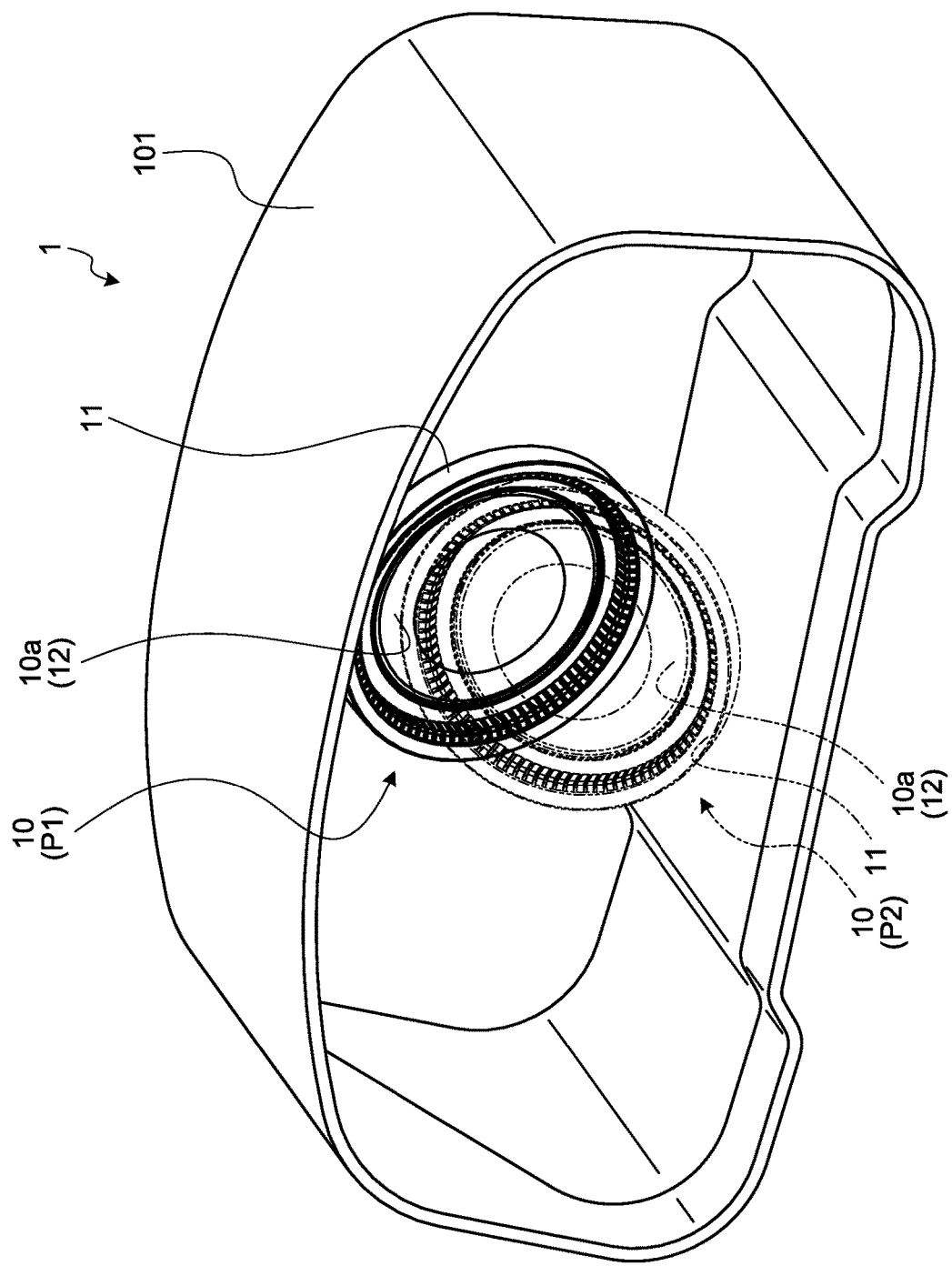
FIG. 1 is a perspective view illustrating a mounted state of a vehicular display system according to an embodiment of the present invention in a vehicle interior.

The following describes in detail an embodiment of a vehicular display system according to the present invention, based on the drawings. The embodiment does not limit the present invention.

Embodiment

The embodiment of the vehicular display system according to the present invention will be described based on FIGS. 1 to 13.

Reference numeral 1 in FIGS. 1 to 7 denotes the vehicular display system of the present embodiment. This vehicular display system 1 is mounted in an interior of a vehicle, and provides vehicle interior display information displayed in the vehicle interior as visual information to users in the vehicle interior. The vehicular display system 1 may display the vehicle interior display information at any place in the vehicle interior. The vehicle interior display information may be any information provided in the vehicle interior.

Figure 5:
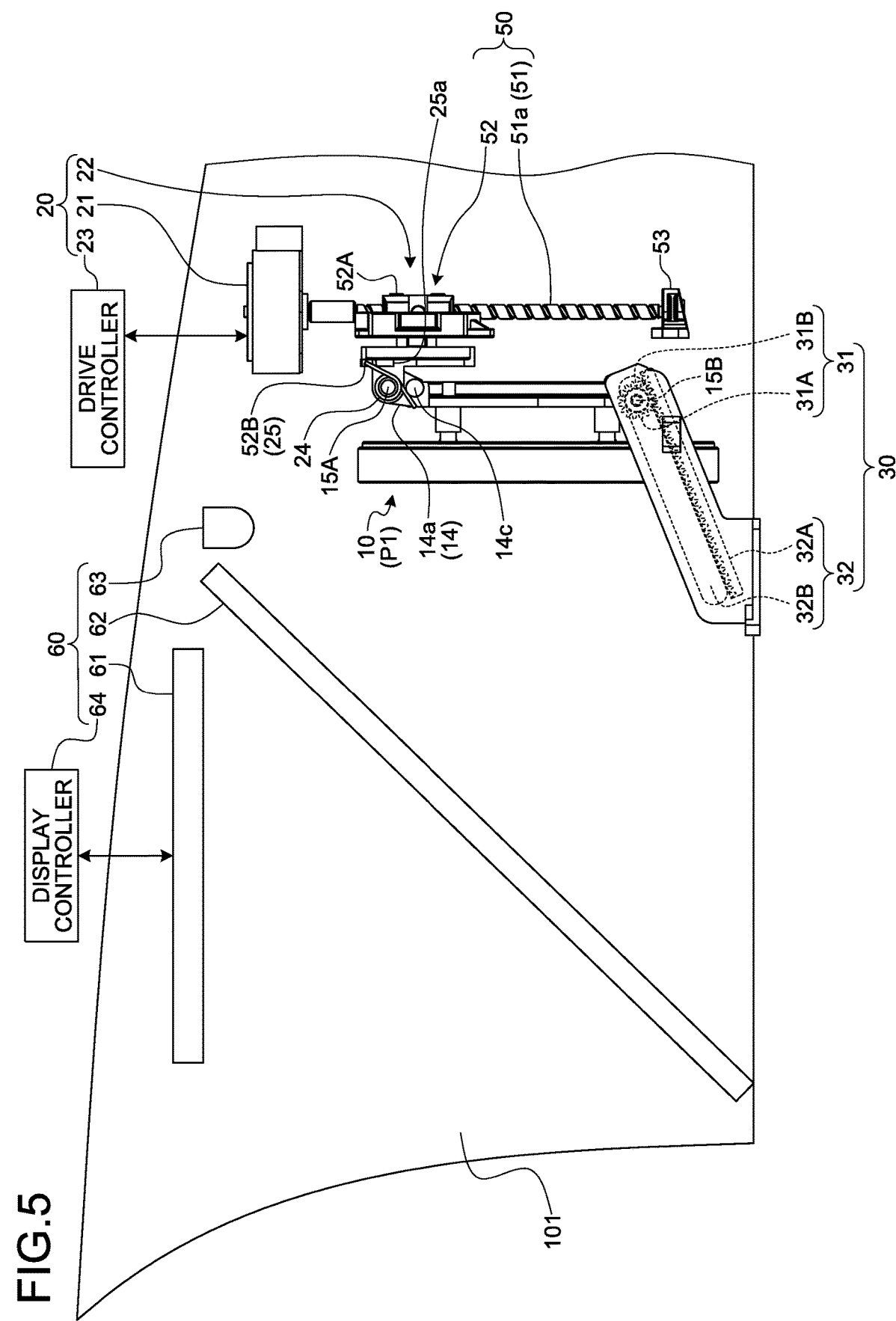
FIG. 5 is a side view illustrating the internal structure of the vehicular display system of the embodiment, and is a view illustrating the state where the movable body is in the erect position.
Figure 6:
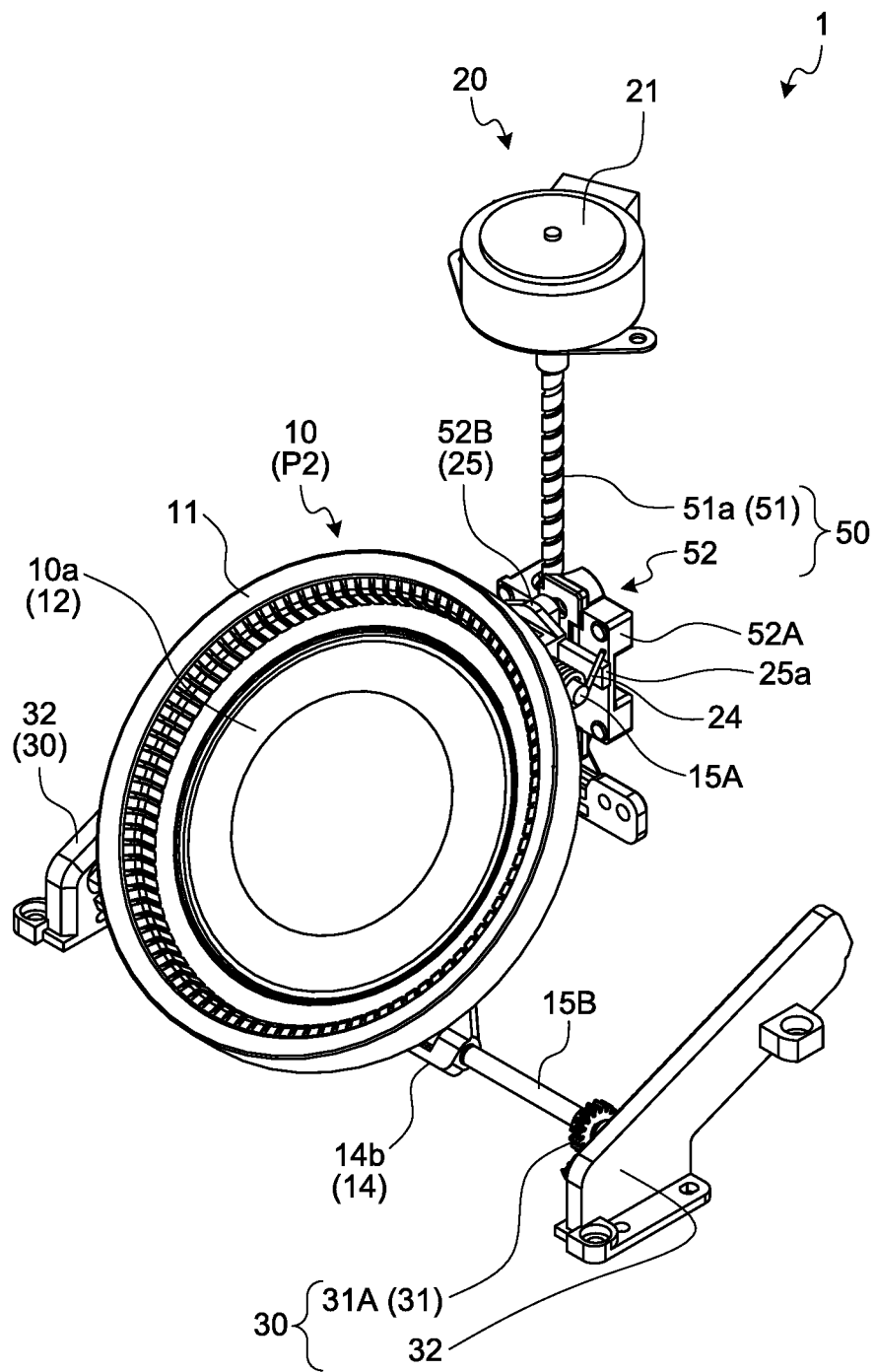
FIG. 6 a perspective view illustrating the internal structure of the vehicular display system of the embodiment, and is a view illustrating a state where the movable body is in a tilted position.
Figure 7:
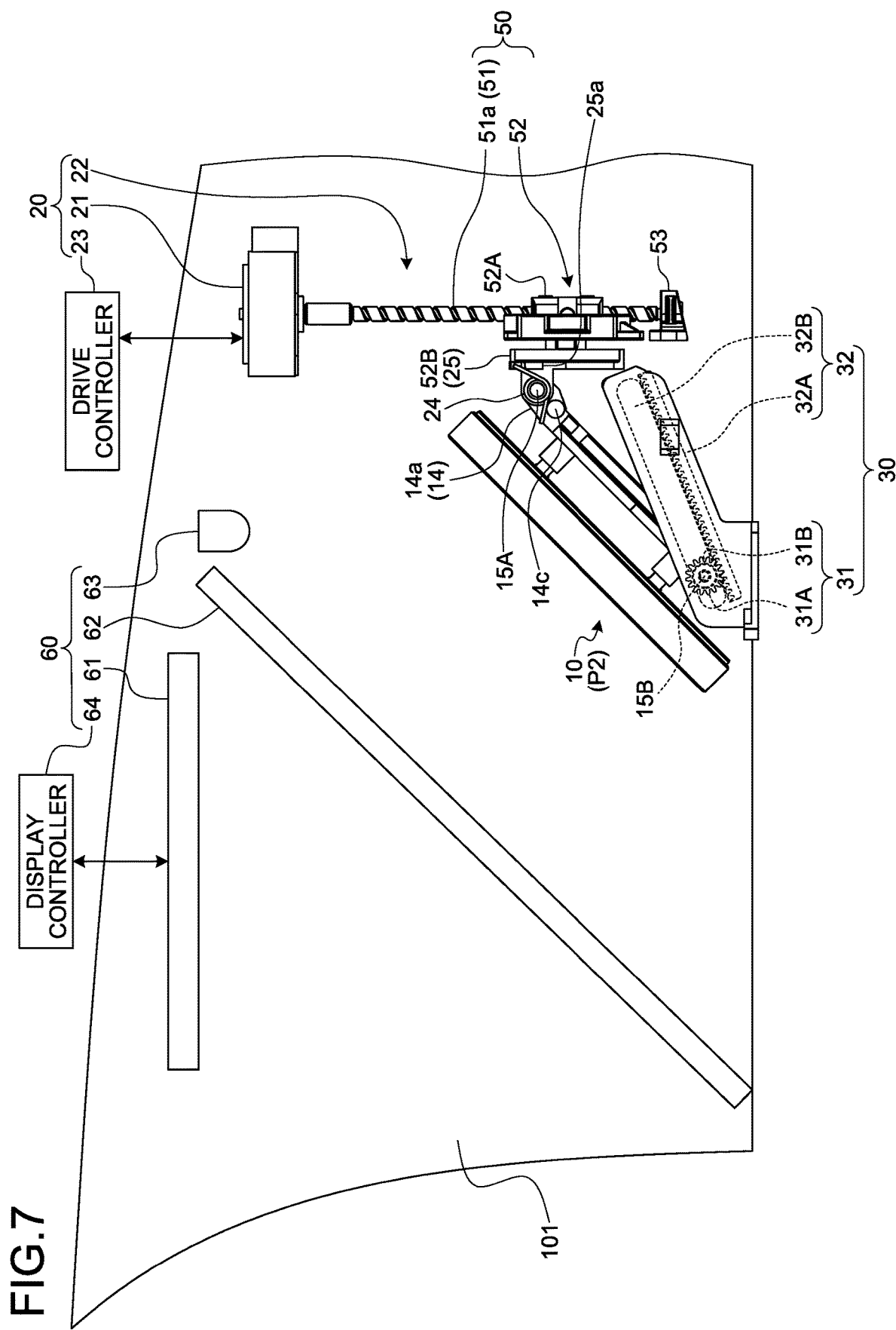
FIG. 7 is a side view illustrating the internal structure of the vehicular display system of the embodiment, and is a view illustrating the state where the movable body is in the tilted position.

The vehicular display system 1 exemplified therein is mainly used as a vehicular measuring instrument, and displays vehicle information, such as a vehicle speed, as the vehicle interior display information in front of the eyes of a driver as a main user. Therefore, the vehicular display system 1 is disposed such that the vehicle interior display information is displayed in an accommodation unit 101 of an instrument panel (FIGS. 1, 5, and 7). The vehicular display system 1 can also display, for example, drive assist information (such as route guidance information of a navigation system and information on other vehicles obtained through road-to-vehicle communication) that contributes to convenience of the driver, as the vehicle interior display information.

The vehicular display system 1 includes a movable body 10 provided with an information display area 10a (FIGS. 1 to 3 and 6). The vehicle interior display information is displayed in the information display area 10a. The information display area 10a may be a place where the vehicle interior display information is directly displayed, or a place where the vehicle interior display information is indirectly displayed. For example, if the movable body 10 is configured as a display unit (such as a liquid crystal panel), the vehicle interior display information is directly displayed in the information display area 10a. In this example, a display device 60 (to be described later) projects the vehicle interior display information on a semi-transparent mirror 62 as, for example, a virtual image so as to overlap the information display area 10a when viewed from the user, and thereby indirectly displays the vehicle interior display information in the information display area 10a.

The vehicular display system 1 of this example is configured to be capable of displacing the movable body 10 between an erect position P1 (FIGS. 2 to 5) and a tilted position P2 (FIGS. 6 and 7) (FIG. 1). The erect position P1 refers to a position in which the information display area 10a is directed toward the user side in the vehicle interior. Herein, the movable body 10 is erected in the vehicle up-down direction at the erect position P1 such that the information display area 10a is directed rearward of the vehicle. However, while the movable body 10 of this example is erected in the vehicle up-down direction, the movable body 10 is tilted such that the vehicle upper side thereof is located slightly more vehicle frontward than the vehicle lower side thereof, and this position is defined as the erect position P1. The tilted position P2 refers to a position in which the information display area 10a is brought closer to a horizontal position than the erect position P1. Herein, the tilted position P2 is defined as a position in which the information display area 10a is brought closer to the horizontal position so as to be directed upward of the vehicle. However, while the movable body 10 of this example is brought closer to the horizontal position so as to be directed upward of the vehicle, the vehicle front side of the movable body 10 is lifted slightly more vehicle upward than the vehicle rear side thereof, and this position is defined as the tilted position P2.

In the vehicular display system 1 of this example, the whole of the movable body 10 is gradually displaced toward the vehicle rear side and the vehicle lower side while increasing the tilt angle thereof with respect to the vehicle up-down direction from that in the erect position P1, and thereby reaches the tilted position P2. The whole of the movable body 10 is gradually displaced toward the vehicle front side and the vehicle upper side while reducing in the tilt angle thereof with respect to the vehicle up-down direction from that in the tilted position P2, and thereby reaches the erect position P1.

The vehicular display system 1 is configured to be capable of using at least the erect position P1 and the tilted position P2 as fixed positions of the movable body 10. Accordingly, the vehicular display system 1 may be configured to be capable of using an intermediate position between the erect position P1 and the tilted position P2 as a fixed position. The vehicular display system 1 is configured to display the vehicle interior display information in the information display area 10a at least in the erect position P1. Accordingly, the vehicular display system 1 may display the vehicle interior display information in the information display area 10a in the tilted position P2, and may be configured to display the vehicle interior display information in the information display area 10a in the intermediate fixed position between the erect position P1 and the tilted position P2.

Furthermore, the vehicular display system 1 may be configured to display the vehicle interior display information in the information display area 10a during the displacement operation between the erect position P1 and the tilted position P2.

The movable body 10 of this example includes a frame 11 and a closing member 12 that closes a space inside the frame 11 (FIGS. 1 to 4 and 6). The vehicular display system 1 allows the user to view the vehicle interior display information as if the vehicle interior display information were displayed inside the frame 11. Accordingly, in the movable body 10 of this example, a wall surface of the closing member 12 inside the frame 11 is used as the information display area 10a.

The frame 11 is formed into an annular shape or a non-annular shape lacking a part of the annular shape. For example, the frame 11 is formed into a circular ring shape or a C-ring shape. The frame 11 in this example is formed into a circular ring shape.

The frame 11 is used as a decorative member serving as a visual object of the user. Accordingly, the frame 11 is formed, for example, into the circular ring shape from, for example, a synthetic resin material, and is subjected to, for example, a metallic treatment at least in a position visible from the user, and thereby is improved in appearance. To further improve the appearance, the frame 11 is preferably formed from a mineral (such as a metal) as a raw material.

The closing member 12 is formed into a shape fitting with a shape of a space inside the frame 11, and is mounted to the frame 11 from the back side (the vehicle front side in the erect position P1 or the vehicle lower side in the tilted position P2) thereof such that the user can view the frame 11. The closing member 12 of this example is formed into a circular disc shape so as to fit with a circular shape inside the frame 11, and a wall surface thereof on the user side inside the frame 11 is used as the information display area 10a. The closing member 12 is formed from, for example, a dark-colored synthetic resin material so as not to allow the user to view a mechanism or the like on the back side (the vehicle front side in the erect position P1 or the vehicle lower side in the tilted position P2) of the closing member 12.

Hereinafter, for the sake of convenience, the "front side" of the movable body 10 denotes the vehicle rear side of the movable body 10 in the erect position P1 or the vehicle upper side of the movable body 10 in the tilted position P2, and the "back side" of the movable body 10 denotes the vehicle front side of the movable body 10 in the erect position P1 or the vehicle lower side of the movable body 10 in the tilted position P2.

The movable body 10 is held from the back side by a holding member 14 (FIGS. 2 to 7), and is displaced between the erect position P1 and the tilted position P2 via the holding member 14. The holding member 14 is formed from, for example, a synthetic resin material, and is integrated with the movable body 10 using fastening members, such as screw members (not illustrated).

Figure 3:
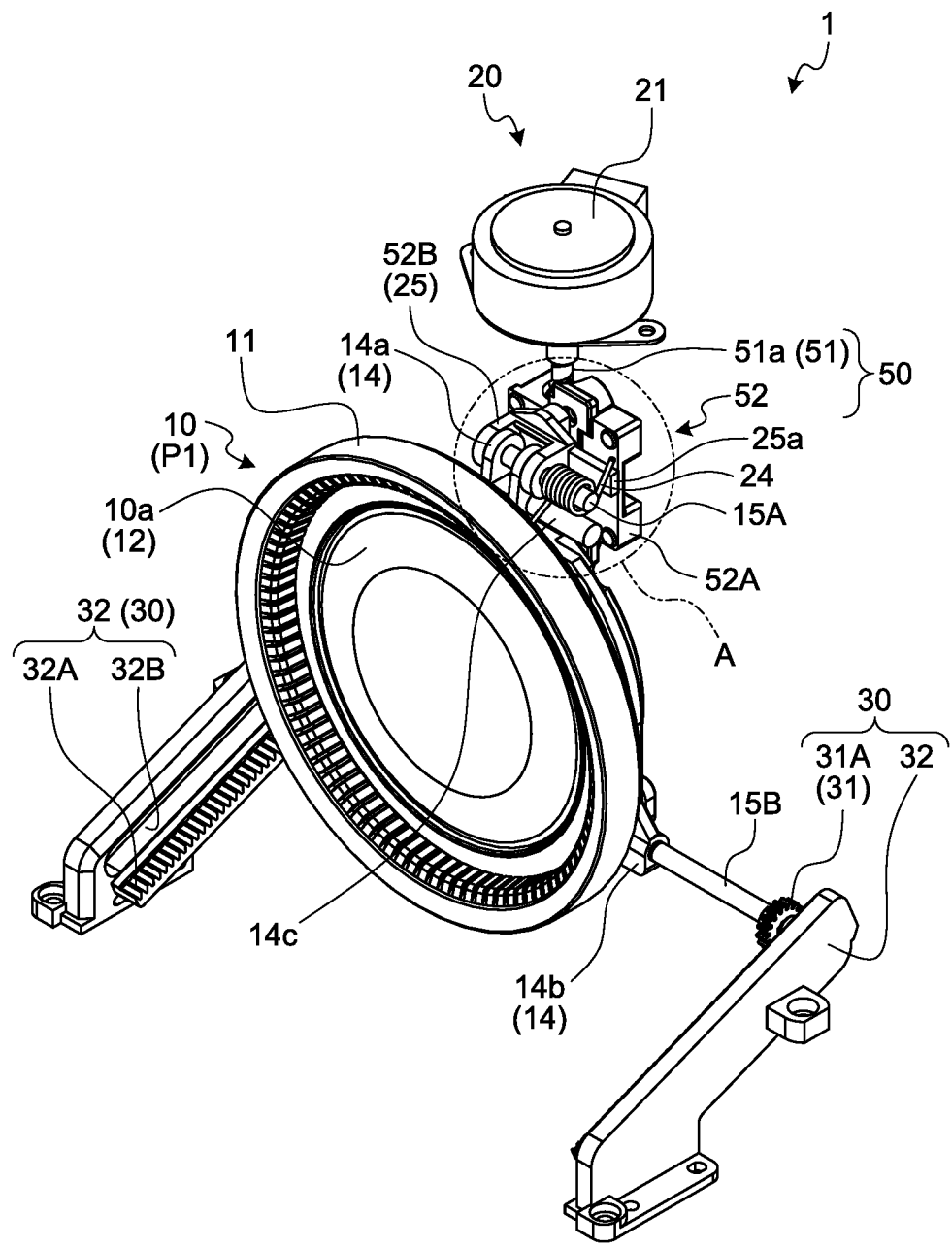
FIG. 3 is a perspective view illustrating an internal structure of the vehicular display system of the embodiment, and is a view illustrating a state where a movable body is in an erect position.
Figure 4:
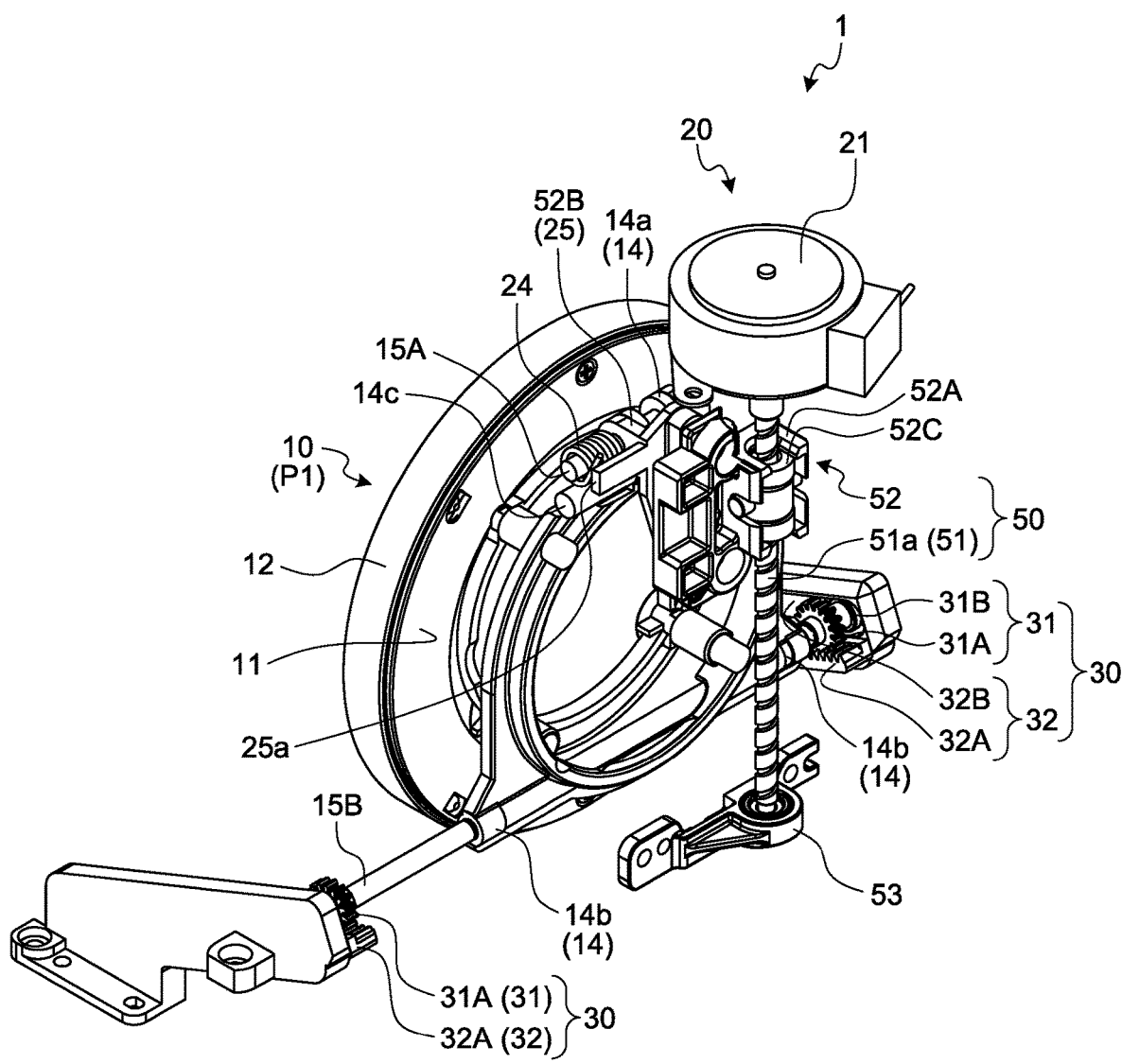
FIG. 4 is a perspective view of the internal structure of the vehicular display system of the embodiment as viewed from another angle, and is a view illustrating the state where the movable body is in the erect position.

The vehicular display system 1 includes a first moving body that is disposed on one of the vehicle upper side and the vehicle lower side of the movable body 10 in the erect position P1 and moves in an integrated manner with the movable body 10 and a second moving body that is disposed on the other thereof and moves in an integrated manner with the movable body 10. The first moving body and the second moving body are provided at the holding member 14. The holding member 14 of this example has a first moving body 14a on the vehicle upper side thereof and a second moving body 14b on the vehicle lower side thereof (FIGS. 2 to 4).

The vehicular display system 1 includes a drive device 20 that displaces the movable body 10 between the erect position P1 and the tilted position P2 via the holding member 14, and a guide device 30 that assists the displacement operation of the movable body 10 between the erect position P1 and the tilted position P2 (FIGS. 2 to 7).

Figure 2:
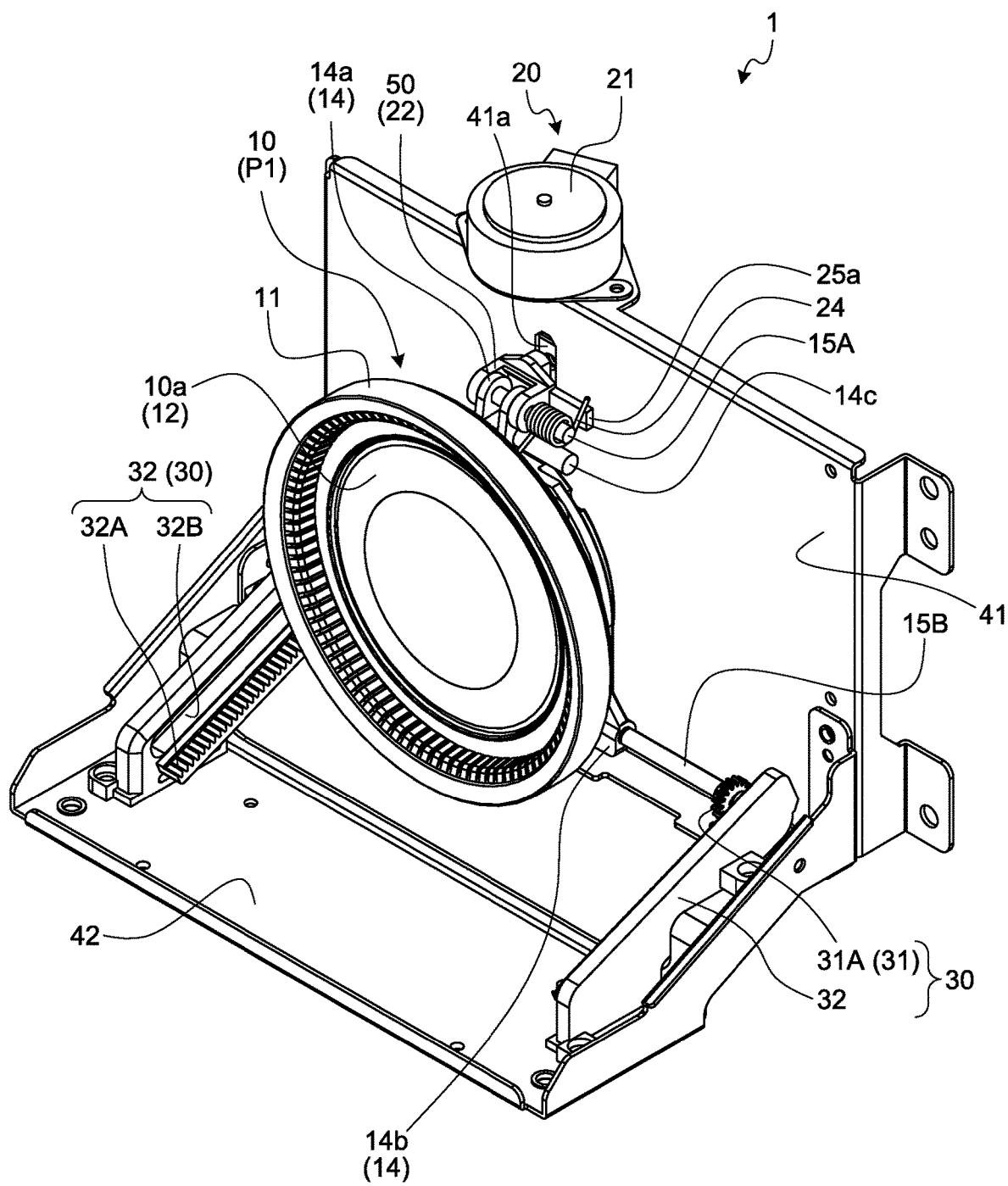
FIG. 2 is a perspective view illustrating the vehicular display system of the embodiment.

The drive device 20 and the guide device 30 are mounted and supported on a structural member 41 and a structural member 42 of this system (FIG. 2). The structural member 41 and the structural member 42 are formed from, for example, a metal material. The structural member 41 is formed from, for example, a metal sheet as a base material, and is disposed between the movable body 10 in the erect position P1 and the drive device 20 so as to be capable of covering and hiding the drive device 20 from the user side as far as possible. The structural member 42 is formed from, for example, a metal sheet as a base material, and is disposed on the vehicle lower side of the movable body 10 in the erect position P1 and on the back side of the movable body 10 in the tilted position P2. The guide device 30 is placed on the structural member 42. In the vehicular display system 1, to allow the user to view only the movable body 10 as far as possible, the structural member 41 and the structural member 42 are, covered together with the drive device 20 and the guide device 30, by a cover member (not illustrated) so as to prevent the user from viewing these components. Accordingly, the cover member is formed from, for example, a dark-colored synthetic resin material.

The drive device 20 includes a power source 21, a power transmission device 22, and a drive controller 23 (FIGS. 5 and 7). The drive device 20 transmits power of the power source 21 as a driving force during the displacement operation of the movable body 10 between the erect position P1 and the tilted position P2 to the first moving body 14a via the power transmission device 22. The drive device 20 is disposed mainly on the back side of the movable body 10 in the erect position P1 and on the back side (vehicle front side) of the structural member 41, and is mounted on the structural member 41.

The power source 21 generates the power serving as a source of the driving force for displacing the movable body 10. In this example, an electric motor is used as the power source 21. The power source 21 is controlled by the drive controller 23. For example, the drive controller 23 controls the power output from the power source 21 according to a target position after the displacement of the movable body 10. The power source 21 of this example is mounted on the structural member 41 using fastening members, such as screw members (not illustrated).

The power of the power source 21 is transmitted to the power transmission device 22 either directly or indirectly via, for example, a group of gears. When the power of the power source 21 is transmitted, the power transmission device 22 displaces the movable body 10 between the erect position P1 and the tilted position P2. The power transmission device 22 converts the power transmitted from the power source 21 into the driving force, and transmits it to the movable body 10. The power transmission device 22 of this example is mounted on the structural member 41 using fastening members, such as screw members (not illustrated). The power transmission device 22 includes a power transmission mechanism 50 (FIGS. 2 to 7).

The power transmission mechanism 50 is a movement direction conversion mechanism that converts rotational torque about an axis into a force along the axis line direction. The power transmission mechanism 50 of this example includes a shaft member 51 and a movement direction conversion member 52 reciprocatable on the shaft member 51 along the axis line direction thereof along with the rotation of the shaft member 51 about the axis (FIGS. 3 to 7). Specifically, the power transmission mechanism 50 is configured as what is called a lead screw mechanism.

The power of the power source 21 is transmitted to the shaft member 51 either directly or indirectly via, for example, the group of gears. The shaft member 51 is disposed with the axis line extending in the vehicle up-down direction. An end on the vehicle upper side of shaft member 51 is mounted to the power source 21 side so as to be rotatable about the axis, and the other end on the vehicle lower side thereof is mounted to the structural member 41 with a bearing 53 (FIG. 4) interposed therebetween so as to be rotatable about the axis. The shaft member 51 of this example is tilted at the same angle as the tilt angle of the movable body 10 in the erect position P1. The shaft member 51 of this example is disposed on the back side of the structural member 41. The shaft member 51 is formed from, for example, a metal material into a circular cylinder or tube shape, and has a male threaded portion 51a threaded along the axis direction on the outer circumferential surface of the circular cylinder or tube shape (FIGS. 3 to 7).

The movement direction conversion member 52 has a female threaded portion (not illustrated) screwed onto the male threaded portion 51a. The power of the power source 21 is transmitted to the movement direction conversion member 52 via the shaft member 51. The movement direction conversion member 52 of this example is broadly divided into a first movement direction conversion member 52A and a second movement direction conversion member 52B (FIGS. 3, 5, and 7).

The first movement direction conversion member 52A is formed from, for example, a synthetic resin material, and is disposed on the back side of the structural member 41. A female threaded member 52C having a female threaded portion is mounted to the first movement direction conversion member 52A (FIG. 4). The first movement direction conversion member 52A is rotatably held on the shaft member 51 in the state where the male threaded portion 51a is screwed into the female threaded portion. The first movement direction conversion member 52A is mounted to the structural member 42 with the second movement direction conversion member 52B, the holding member 14, and the guide device 30 interposed therebetween so as not to make a movement other than the movement along the axis line direction of the shaft member 51.

Accordingly, the first movement direction conversion member 52A can reciprocate on the shaft member 51 along the axis line direction thereof in conjunction with the axial rotation of the shaft member 51 to which the power of the power source 21 is transmitted.

The second movement direction conversion member 52B is formed from a synthetic resin material, and is disposed on the front side (vehicle rear side) of the structural member 41. The second movement direction conversion member 52B is mounted to the first movement direction conversion member 52A using fastening members, such as screw members (not illustrated). Accordingly, the second movement direction conversion member 52B can reciprocate together with the first movement direction conversion member 52A along the axis line direction of the shaft member 51 in conjunction with the axial rotation of the shaft member 51 to which the power of the power source 21 is transmitted. A through-hole 41a is formed in the structural member 41 so as not to block the reciprocation of the movement direction conversion member 52 (FIG. 2).

The first moving body 14a is rotatably mounted to the second movement direction conversion member 52B with a first rotary shaft 15A (FIGS. 2 to 7) interposed therebetween. Accordingly, the power of the power source 21 transmitted to the movement direction conversion member 52 is transmitted to the first moving body 14a via the first rotary shaft 15A. The first rotary shaft 15A is formed from, for example, a metal material into a circular cylinder or tube shape, and is disposed such that the axis line thereof extends in the vehicle width direction. The second movement direction conversion member 52B makes, as a movement thereof, only reciprocation along the axis line direction of the shaft member 51. Therefore, when making the reciprocation, the second movement direction conversion member 52B can relatively rotate the first moving body 14a via the first rotary shaft 15A while transmitting the power of the power source 21 via the first rotary shaft 15A to the first moving body 14a. Accordingly, when the power of the power source 21 is transmitted to the first moving body 14a, the drive device 20 can displace the movable body 10 between the erect position P1 and the tilted position P2 while rotating the first moving body 14a relative to the second movement direction conversion member 52B about the axis of the first rotary shaft 15A in conjunction with the operation of the guide device 30.

Figure 8:
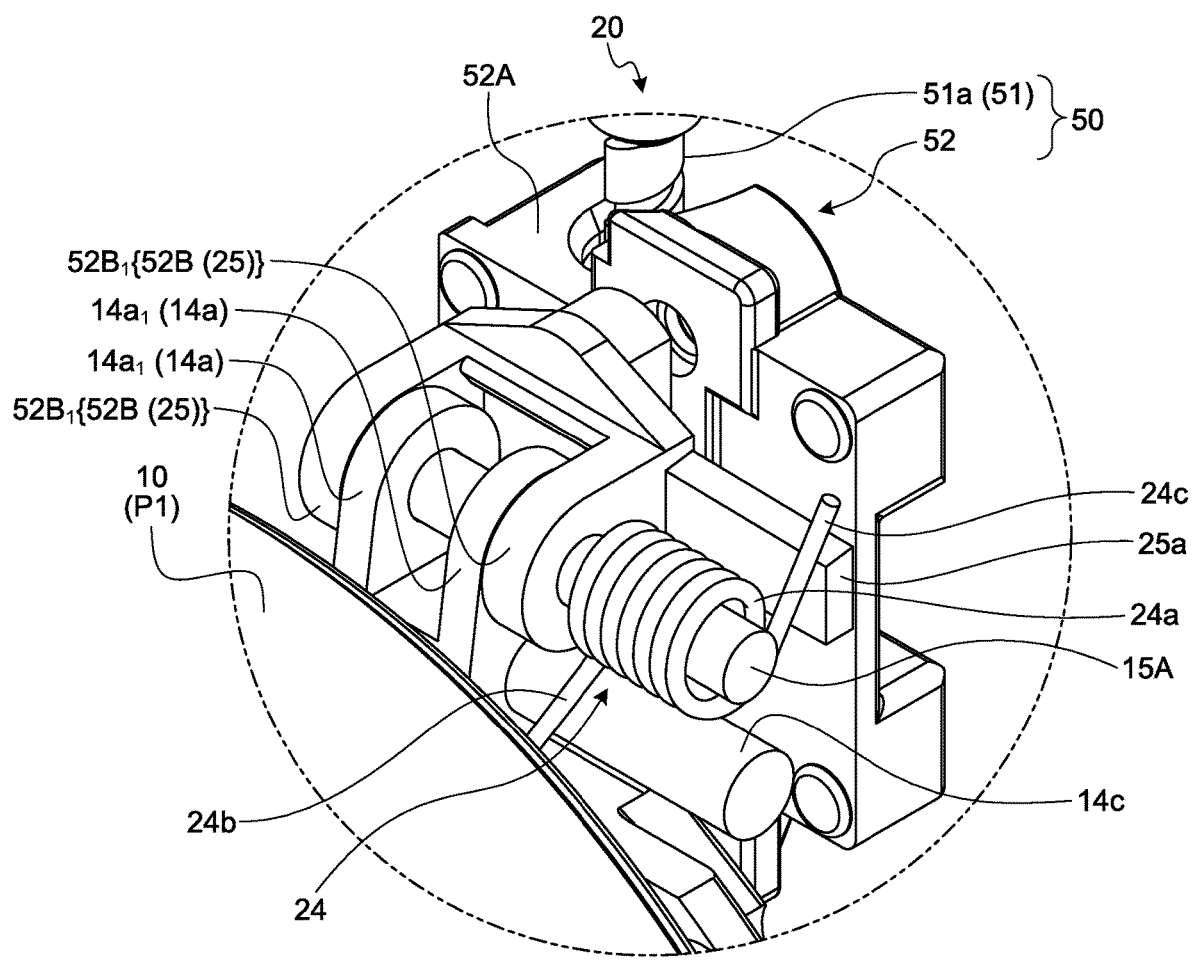
FIG. 8 is an enlarged view of part A of FIG. 3.
Figure 9:
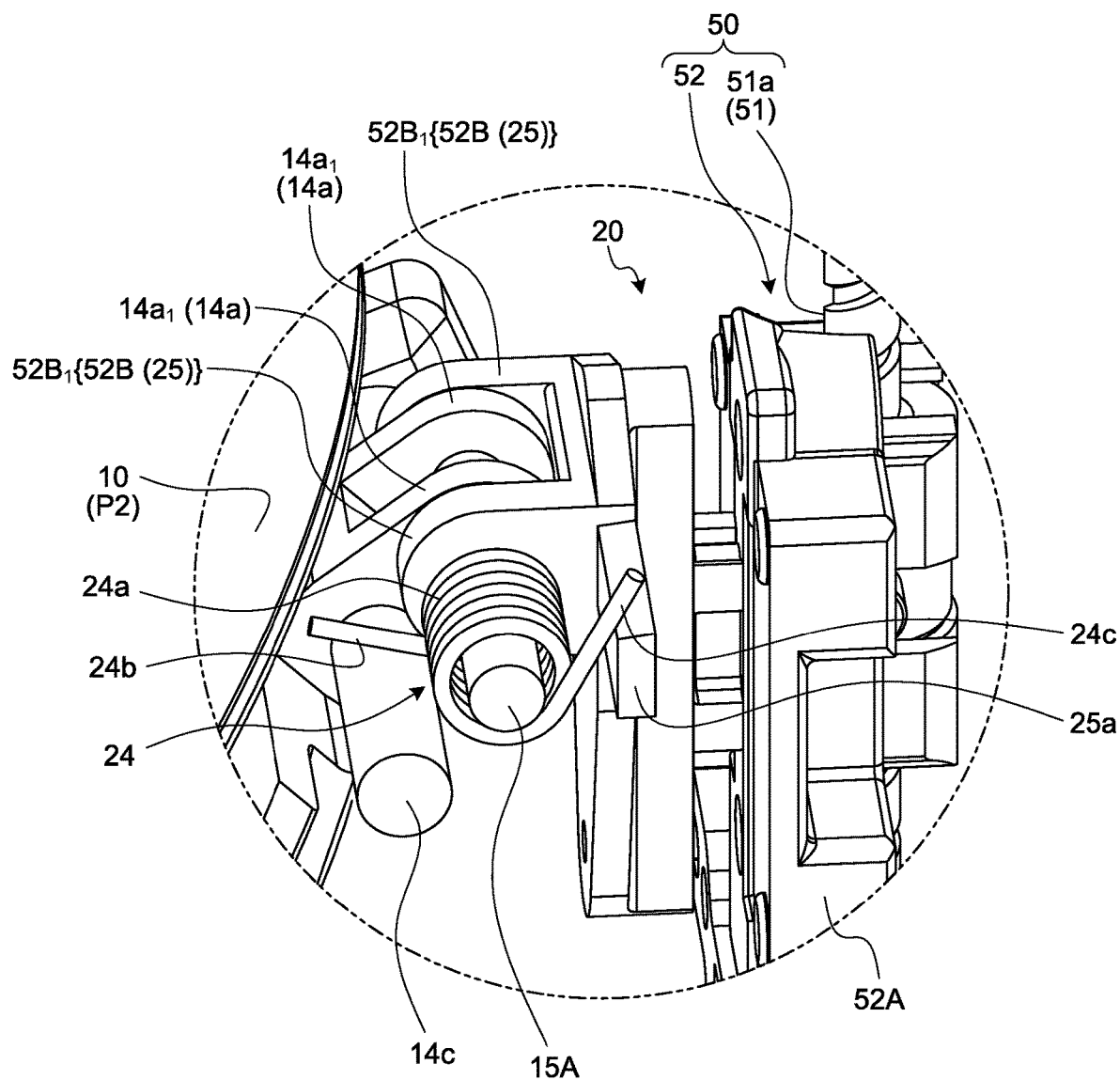
FIG. 9 a perspective view illustrating a periphery of an elastic member in the state where the movable body is in the tilted position.
Figure 10:
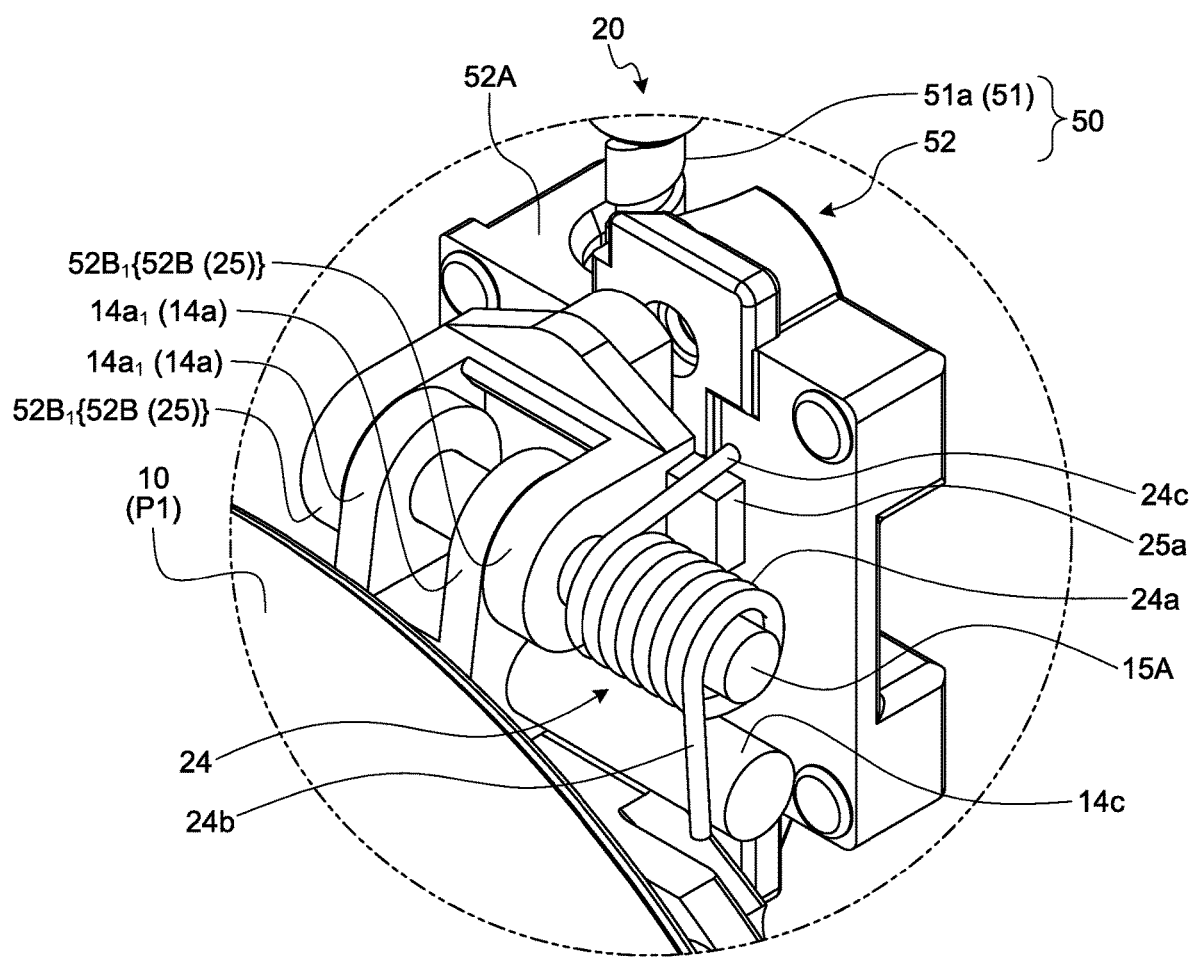
FIG. 10 is a perspective view illustrating a deformation mode of the elastic member in the mounted state, and illustrates the periphery of the elastic member in the state where the movable body is in the erect position.
Figure 11:
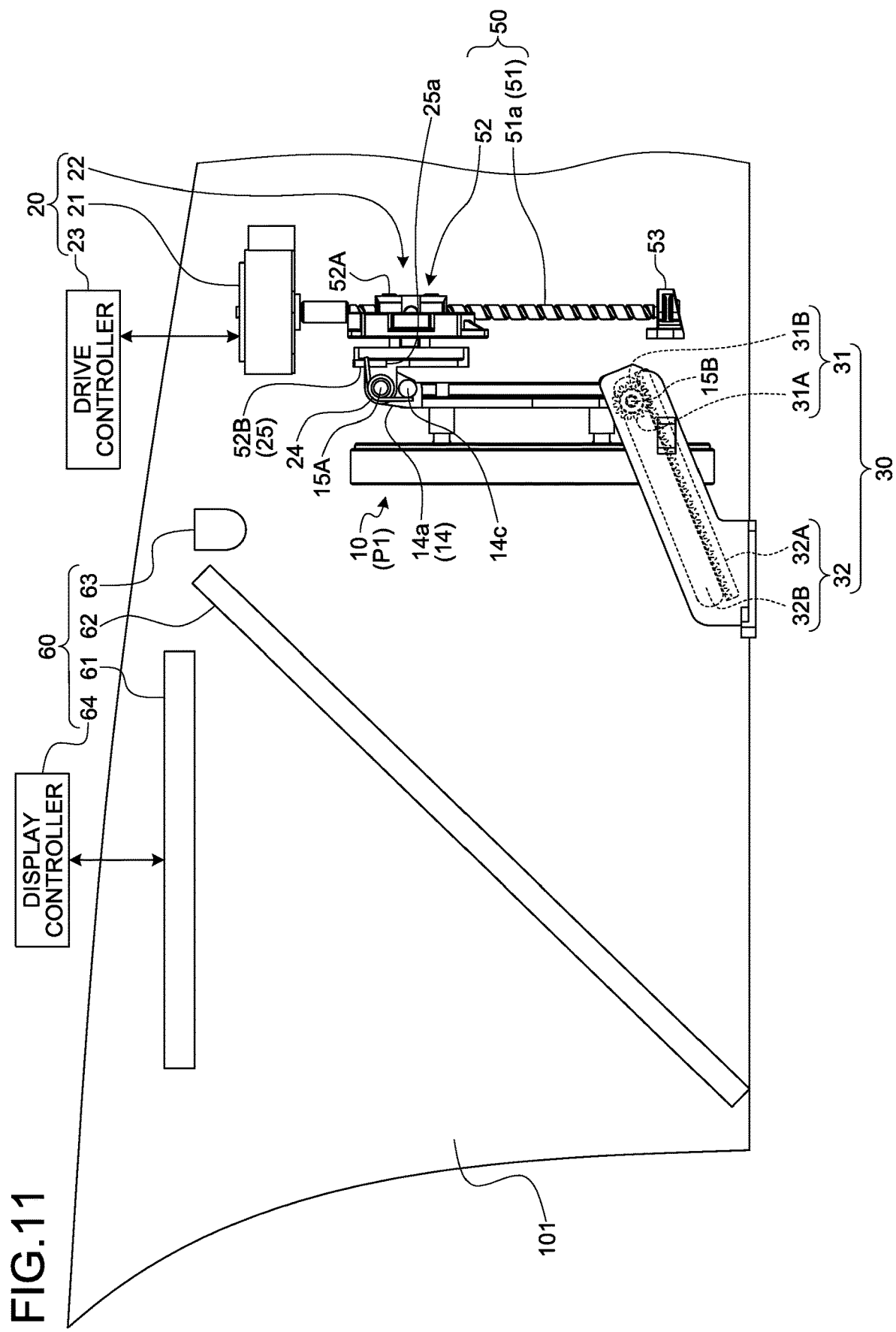
FIG. 11 is a side view illustrating the deformation mode of the elastic member in the mounted state, and illustrates the internal structure of the vehicular display system in the state where the movable body is in the erect position.
Figure 12:
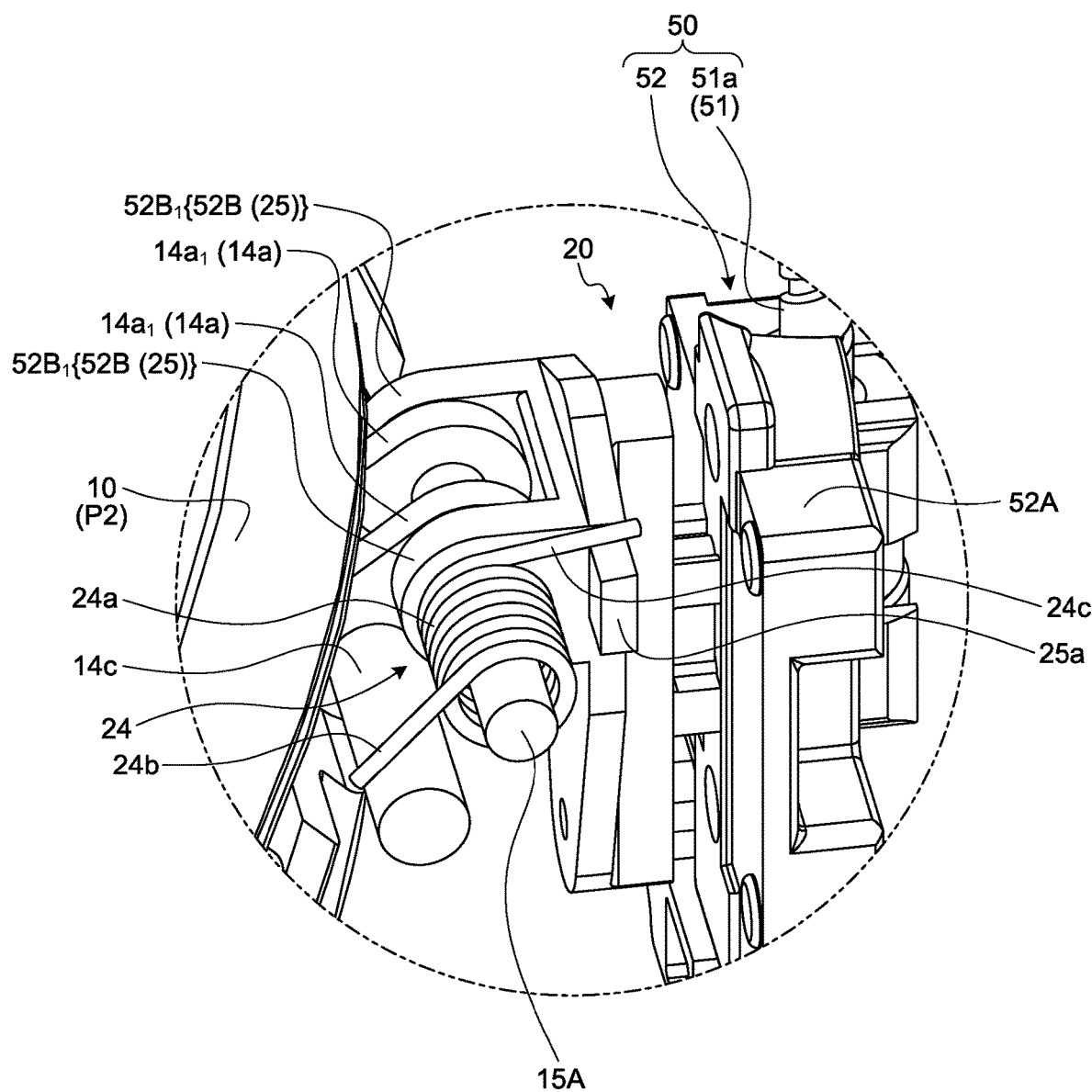
FIG. 12 is a perspective view illustrating the deformation mode of the elastic member in the mounted state, and illustrates the periphery of the elastic member in the state where the movable body is in the tilted position.
Figure 13:
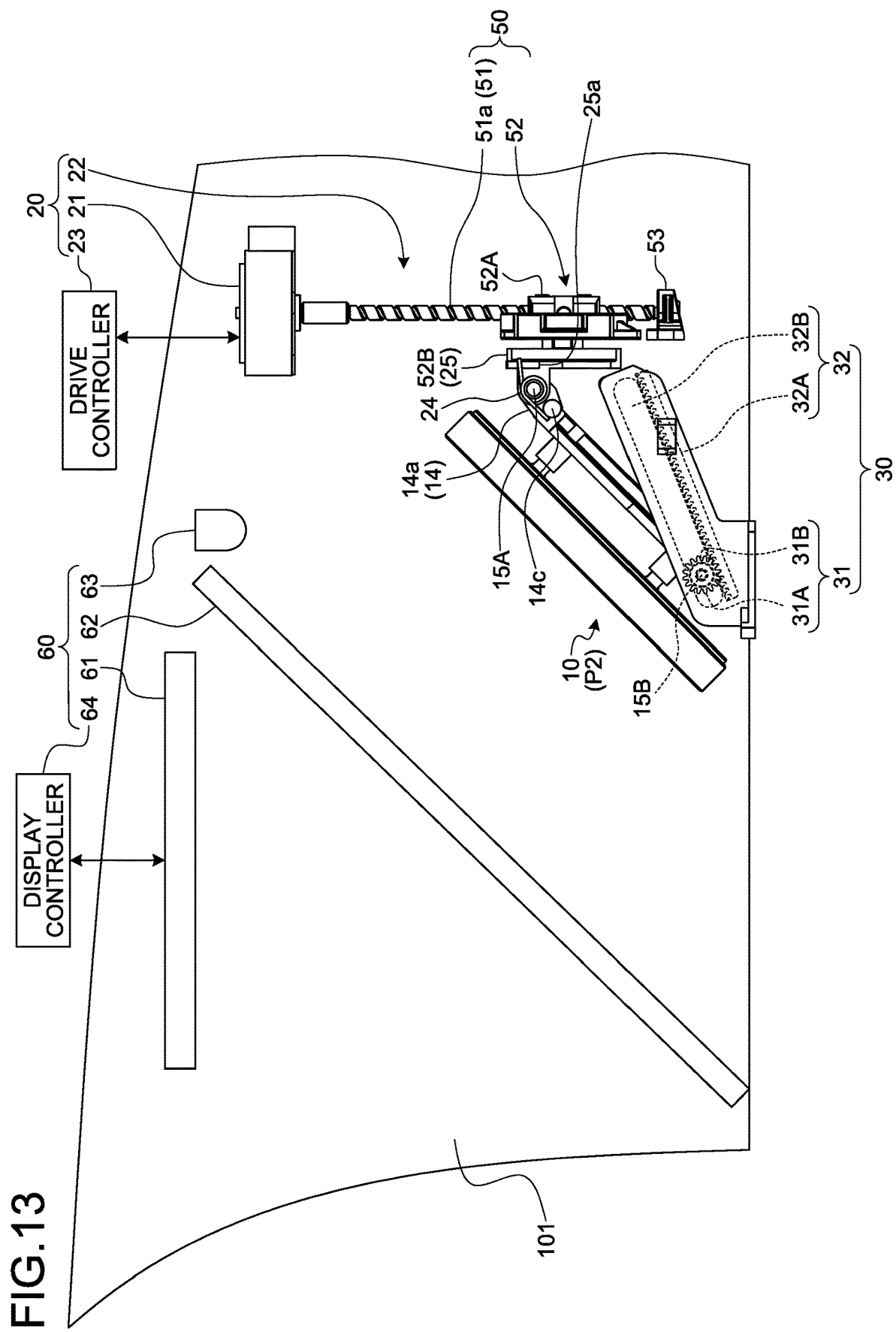
FIG. 13 is a side view illustrating the deformation mode of the elastic member in the mounted state, and illustrates the internal structure of the vehicular display system in the state where the movable body is in the tilted position.

For example, the first moving body 14a is provided with two piece portions $14a_1$ arranged so as to be opposed to each other with a space therebetween in the axis line direction of the first rotary shaft 15A. The second movement direction conversion member 52B is provided with two piece portions $52B_1$ arranged so as to be opposed to each other with a space therebetween in the axis line direction of the first rotary shaft 15A (FIGS. 8 and 9). The first moving body 14a and the second movement direction conversion member 52B are coupled together by arranging one of the piece portions $14a_1$ and one of the piece portions $52B_1$ so as to be opposed in the axis line direction of the first rotary shaft 15A, and arranging the other of the piece portions $14a_1$ and the other of the piece portions $52B_1$ so as to be opposed in the axis line direction of the first rotary shaft 15A, and by inserting the first rotary shaft 15A into through-holes of the respective piece portions $14a_1$ and $52B_1$.

The guide device 30 guides the movable body 10 along the displacement operation between the erect position P1 and the tilted position P2 so as to assist the displacement operation. The guide device 30 includes a guided portion 31 and a guide rail 32 for guiding the guided portion 31 (FIGS. 2 to 5 and 7). In this example, a pair of the guided portions 31 and the guide rails 32 are provided on the vehicle left side and the vehicle right side as viewed from the movable body 10, one of the pair on each side.

In the guide device 30, the displacement operation is guided by guiding the guided portion 31 provided at the second moving body 14b in the vehicle front-rear direction along the guide rail 32. At that time, the second moving body 14b is guided with respect to the guide rail 32 while relatively rotating about the axis of a second rotary shaft 15B (FIGS. 2 to 7). The second rotary shaft 15B is formed from, for example, a metal material into a circular cylinder or tube shape. The second rotary shaft 15B is disposed such that the axis line thereof extends in the vehicle width direction so as to align the axis line direction thereof with the axis line direction of the first rotary shaft 15A.

The guided portion 31 of this example is constituted by first and second concentric rotary bodies 31A and 31B provided to the second rotary shaft 15B (FIGS. 4, 5, and 7). The first and second rotary bodies 31A and 31B form a pair, and sets of the pair are provided at both ends of the second rotary shaft 15B, one set at each end. Each of the first and second rotary bodies 31A and 31B may be a circular disc-like member or a circular ring-like member using the outer circumferential surface thereof as a rolling surface, or may be a spur gear. In this example, a spur gear is used as the first rotary body 31A whereas a circular ring-like member is used as the second rotary body 31B.

The guide rail 32 is mounted on the structural member 42 using fastening members, such as screw members (not illustrated). The guide rail 32 includes a rack portion 32A meshed with teeth of the first rotary body 31A and an accommodation unit 32B that accommodates the second rotary body 31B (FIGS. 2 to 5 and 7). The rack portion 32A rotates the first rotary body 31A along the displacement operation of the movable body 10 between the erect position P1 and the tilted position P2 while meshing teeth thereof with the teeth of the first rotary body 31A. The accommodation unit 32B sandwiches the rolling surface of the second rotary body 31B in the vehicle up-down direction, and at the same time, guides the second rotary body 31B along the displacement operation of the movable body 10 between the erect position P1 and the tilted position P2 while rotating the second rotary body 31B. The rack portion 32A and the accommodation unit 32B extend in the vehicle front-rear direction, and are inclined such that the vehicle rear side thereof is located on the vehicle lower side than the vehicle front side thereof.

When the drive device 20 displaces the movable body 10 between the erect position P1 and the tilted position P2, the guide device 30 rotates the second moving body 14b about the axis of the second rotary shaft 15B relative to the respective guide rails 32 while guiding the second moving body 14b with the respective guide rails 32 via the respective guided portions 31. In other words, the guide device 30 guides the second moving body 14b along the displacement operation of the movable body 10 while relatively rotating the second moving body 14b about the axis of the second rotary shaft 15B.

For example, in the drive device 20, when the movable body 10 is displaced from the tilted position P2 side to the erect position P1 side, the load of the power source 21 increases with increase in the mass of the movable body 10. For example, in the guide device 30, when the movable body 10 is displaced from the tilted position P2 side to the erect position P1 side, a higher stress may act between the guided portion 31 and the guide rail 32 or dragging resistance may be generated therebetween as the mass of the movable body 10 increases.

Accordingly, the vehicular display system 1 of the present embodiment is configured to apply an elastic force between the movable body 10 and the drive device 20, the elastic force being due to the displacement operation of the movable body 10 from the tilted position P2 side to the erect position P1 side. The vehicular display system 1 includes an elastic member 24 that apples such an elastic force (FIGS. 2 to 9). The elastic member 24 includes a main portion 24a that generates the elastic force and engagement portions 24b and 24c provided at both ends of the main portion 24a (FIGS. 8 and 9). The engagement portion 24b is a portion for engaging with the movable body 10 side, and applies the elastic force generated by the main portion 24a to the movable body 10 side. The engagement portion 24c is a portion for engaging with the drive device 20 side, and applies the elastic force generated by the main portion 24a to the drive device 20 side.

In the vehicular display system 1, when the movable body 10 is displaced from the tilted position P2 side to the erect position P1 side, the elastic force of the elastic member 24 is applied as an assist force for the force by the power of the power source 21 to the movable body 10. Accordingly, the vehicular display system 1 can reduce the load of the power source 21 when the movable body 10 is displaced from the tilted position P2 side to the erect position P1 side. The vehicular display system 1 can also reduce the stress generated between the guided portion 31 and the guide rail 32 of the guide device 30 when the movable body 10 is displaced from the tilted position P2 side to the erect position P1 side. The vehicular display system 1 can also restrain the generation of the dragging resistance between the guided portion 31 and the guide rail 32 when the movable body 10 is displaced from the tilted position P2 side to the erect position P1 side.

The elastic member 24 is provided, for example, so as to increase the elastic force with increase in the amount of the displacement of the movable body 10 from the erect position P1 toward the tilted position P2. For example, when the movable body 10 is displaced from the tilted position P2 side to the erect position P1 side, the load of the power source 21 increases with increase in the amount of the displacement of the movable body 10 from the erect position P1 toward the tilted position P2. Accordingly, the vehicular display system 1 includes the elastic member 24 capable of generating the elastic force corresponding to the amount of the displacement, and can thereby reduce the load of the power source 21 regardless of the amount of the displacement when the movable body 10 is displaced from the tilted position P2 side to the erect position P1 side. The elastic member 24 is provided so as to generate a larger elastic force as the mass of the movable body 10 is larger.

Specifically, the drive device 20 of this example includes a holding body 25 that holds the first moving body 14a in a state relatively rotatable about the axis of the first rotary shaft 15A, and the elastic member 24 is disposed between the first moving body 14a and the holding body 25 (FIGS. 3 to 9). In this case, the elastic member 24 is provided so as to apply the elastic force to the first moving body 14a and the holding body 25 in directions opposite to each other along a circle about the axis of the first rotary shaft 15A. Herein, the second movement direction conversion member 52B is used as the holding body 25.

A torsion coil spring can be suitably used as the elastic member 24 such as that described above. The main portion 24a of the elastic member 24 serving as a helical spring is disposed on the same axis line as that of the first rotary shaft 15A, and the engagement portion 24b at one end of the elastic member 24 is engaged with the first moving body 14a whereas the engagement portion 24c at the other end thereof is engaged with the holding body 25.

The first rotary shaft 15A is inserted into the main portion 24a of the elastic member 24 of this example so as to concentrically dispose the elastic member 24 on the first rotary shaft 15A. For example, an end of the first rotary shaft 15A may be projected from at least one of one side of the piece portions $14a_1$ and $52B_1$ and the other side of the piece portions $14a_1$ and $52B_1$. In this case, the elastic member 24 may be disposed on a projected portion at one end of the first rotary shaft 15A, or may be disposed on the projected portion at each of the ends of the first rotary shaft 15A. The elastic member 24 may be disposed between one side of the piece portions $14a_1$ and $52B_1$ and the other side of the piece portions $14a_1$ and $52B_1$. Herein, the elastic member 24 is disposed on the projected portion at one end of the first rotary shaft 15A.

The first rotary shaft 15A is inserted into a space inside the main portion 24a so as to allow the main portion 24a to rotate relative to the first rotary shaft 15A about the axis thereof.

The first moving body 14a is provided with an engaged portion 14c that is engaged with the engagement portion 24b at one end (FIGS. 2 to 5 and 7 to 9). Between the engaged portion 14c and the engagement portion 24b at one end, the elastic force along the circle about the axis of the first rotary shaft 15A is applied from the engagement portion 24b at one end to the engaged portion 14c whereas a reaction force of the elastic force is applied from the engaged portion 14c to the engagement portion 24b at one end. The elastic force and the reaction force act, for example, in a tangential direction along the circle about the axis of the first rotary shaft 15A. The elastic force is applied from the engagement portion 24b at one end to the engaged portion 14c in the counterclockwise direction as seen in FIGS. 5 and 7. In this example, the engagement portion 24b at one end is engaged with the engaged portion 14c in the direction of application of the elastic force.

The holding body 25 (second movement direction conversion member 52B) is provided with an engaged portion 25a that is engaged with the engagement portion 24c at the other end (FIGS. 2 to 9). Between the engaged portion 25a and the engagement portion 24c at the other end, the elastic force along the circle about the axis of the first rotary shaft 15A is applied from the engagement portion 24c at the other end to the engaged portion 25a whereas a reaction force of the elastic force is applied from the engaged portion 25a to the engagement portion 24c at the other end. The elastic force and the reaction force act, for example, in the tangential direction along the circle about the axis of the first rotary shaft 15A. The elastic force is applied from the engagement portion 24c at the other end to the engaged portion 25a in the clockwise direction as seen in FIGS. 5 and 7. In this example, the engagement portion 24c at the other end is engaged with the engaged portion 25a in the direction of application of the elastic force.

Each of the engagement portion 24b at one end and the engagement portion 24c at the other end of the elastic member 24 extends outward in the radial direction of the main portion 24a with respect to main portion 24a. The elastic member 24 is mounted such that an angle formed by the engagement portion 24b at one end and the engagement portion 24c at the other end (hereinafter, called "angle between engagement portions") is smaller when the movable body 10 is in the tilted position P2 than when the movable body 10 is in the erect position P1. In other words, the angle between engagement portions of the elastic member 24 decreases and the elastic force increases with increase in the amount of the displacement of the movable body 10 from the erect position P1 toward the tilted position P2. The angle between engagement portions of the elastic member 24 is defined as an angle on the obtuse side formed by the engagement portion 24b at one end and the engagement portion 24c at the other end when the movable body 10 is in the erect position P1. When the movable body 10 is displaced between the erect position P1 and the tilted position P2, the engagement portion 24c at the other end serves as a fulcrum and does not move. As a result, the angle between engagement portions is reduced while the engagement portion 24b at one end is pressed to be moved by the engaged portion 14c. Therefore, between the engaged portion 14c and the engagement portion 24b at one end, the elastic force corresponding to the amount of the displacement of the movable body 10 (angle between engagement portions) is applied from the engagement portion 24b at one end to the engaged portion 14c whereas the reaction force of the elastic force is applied from the engaged portion 14c to the engagement portion 24b at one end. The elastic force is applied along the direction of the displacement of the movable body 10 when the movable body 10 is displaced from the tilted position P2 side to the erect position P1 side. Accordingly, in the vehicular display system 1, the elastic force is applied as the assist force for the force by the power of the power source 21 to the movable body 10 when the movable body 10 is displaced from the tilted position P2 side to the erect position P1 side. Consequently, the vehicular display system 1 can obtain an effect of, for example, the reduction in the load of the power source 21 stated above.

In addition, the vehicular display system 1 includes the display device 60 that displays the vehicle interior display information so as to be visible by the user in the vehicle interior (FIGS. 5 and 7). The display device 60 is configured to allow the user to view the vehicle interior display information as if the vehicle interior display information were displayed in the information display area 10a inside the frame 11. The display device 60 of this example forms the virtual image on the front side of the information display area 10a, and allows the user to view the vehicle interior display information as if the vehicle interior display information provided by the virtual image were displayed in the information display area 10a. Therefore, the display device 60 includes a display unit 61, the semi-transparent mirror (what is called a half-mirror) 62, a light source 63, and a display controller 64.

The display unit 61 is a device that projects projection light of a display image related to the vehicle interior display information. The display unit 61 may itself form the display image related to the vehicle interior display information, or may receive the display image formed, for example, by the display controller 64. The display unit 61 is exemplified herein to have an image forming function. The display unit 61 is disposed on the vehicle interior side of the movable body 10 and above the accommodation unit 101. The semi-transparent mirror 62 is disposed on the vehicle lower side of the display unit 61 and on the vehicle interior side of the movable body 10 such that the vehicle upper side of the semi-transparent mirror 62 is tilted toward the vehicle front side. The display image projected from the display unit 61 is transmitted through the semi-transparent mirror 62, and forms the virtual image of the display image (vehicle interior display information) on the front side of the frame 11. The light source 63 illuminates, for example, the frame 11, and is disposed on the vehicle interior side and the vehicle upper side of the movable body 10 in the erect position P1, and also, on the vehicle upper side of the movable body 10 in the tilted position P2.

The display controller 64 causes the display unit 61 to form and project the display image corresponding to the fixed position of the movable body 10 so as to allow the user to view the vehicle interior display information as if being displayed in the information display area 10a. For example, the display controller 64 causes the display unit 61 to form and project the display image corresponding to the erect position P1 and the tilted position P2. In the case of not displaying the vehicle interior display information, the display controller 64 prohibits the display unit 61 from forming and projecting the display image regardless of whether the movable body 10 is in the fixed position. The vehicle interior display information is not illustrated herein.

The vehicular display system 1 includes the cover member (not illustrated) for not allowing the user to view things unnecessary to be viewed (for example, the drive device 20, the guide device 30, and ribs inside the accommodation unit 101) while allowing the user to view the vehicle interior display information. The cover member is formed from, for example, a dark-colored semi-transparent synthetic resin material, and is disposed so as to close an opening on the user side of the accommodation unit 101.

As stated above, when the movable body 10 is displaced from the tilted position P2 side to the erect position P1 side, the vehicular display system 1 of the present embodiment applies the elastic force of the elastic member 24 as the assist force for the force by the power of the power source 21 to the movable body 10. Accordingly, when the movable body 10 is displaced from the tilted position P2 side to the erect position P1 side, the vehicular display system 1 can reduce the load of the power source 21, can reduce the stress generated between the guided portion 31 and the guide rail 32 of the guide device 30, and can restrain the generation of the dragging resistance therebetween. For example, the vehicular display system 1 can achieve higher merchantability, such as a better appearance of the frame 11 of the movable body 10, by using the movable body 10 made of a mineral, such as a metal, as a raw material than by using the movable body 10 made of a synthetic resin as a raw material. However, when the movable body 10 made of a mineral, such as a metal, as a raw material is used, a concern arises that, for example, an increase in the mass of the movable body 10 increases the load of the power source 21 from that in the case of using the movable body 10 made of a synthetic resin as a raw material. However, since the vehicular display system 1 of the present embodiment is configured to reduce the load of the power source 21, a heavy material, such as a mineral, can be used as a raw material of the movable body 10. Accordingly, the vehicular display system 1 can achieve the higher merchantability, such as the better appearance of the frame 11 of the movable body 10.

In the above-described example, the elastic member 24 is mounted so as to reduce the angle formed by the engagement portion 24b at one end and the engagement portion 24c at the other end (angle between engagement portions) to increase the elastic force with increase in the amount of the displacement of the movable body 10 from the erect position P1 toward the tilted position P2. The elastic member 24 may, however, be mounted so as to increase the angle between engagement portions to increase the elastic force with increase in the amount of the displacement of the movable body 10 from the erect position P1 toward the tilted position P2 (FIGS. 10 to 13). The angle between engagement portions of the elastic member 24 is defined as an angle on the obtuse side formed by the engagement portion 24b at one end and the engagement portion 24c at the other end when the movable body 10 is in the erect position P1. When the movable body 10 is displaced between the erect position P1 and the tilted position P2, the engagement portion 24c at the other end serves as a fulcrum and does not move. As a result, the angle between engagement portions is increased while the engagement portion 24b at one end is pressed to be moved by the engaged portion 14c. The vehicular display system 1 of the present embodiment can obtain the same effect as that of the above-described example even when the elastic member 24 is mounted as described above.

The vehicular display system according to the present embodiment applies the elastic force of the elastic member as the assist force for the force by the power of the power source to the movable body when the movable body is displaced from the tilted position side to the erect position side. Accordingly, the vehicular display system can reduce the load of the power source when the movable body is displaced from the tilted position side to the erect position side.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular display system comprising:
   a movable body that is displaceable between an erect position in which an information display area is directed toward a user side and a tilted position in which the information display area is brought closer to a horizontal position than the erect position;
   a first moving body that is disposed on one of a vehicle upper side and a vehicle lower side of the movable body in the erect position, and is configured to move in an integrated manner with the movable body;
   a second moving body that is disposed on the other of the vehicle upper side and the vehicle lower side of the movable body in the erect position, and is configured to move in an integrated manner with the movable body;
   a drive device configured to transmit power of a power source to the first moving body via a power transmission device, and to displace the movable body between the erect position and the tilted position while relatively rotating the first moving body about an axis of a first rotary shaft;
   a guide device configured to guide the second moving body along the displacement operation of the movable body between the erect position and the tilted position while relatively rotating the second moving body about an axis of a second rotary shaft;
   a display device configured to allow the user to view vehicle interior display information as if the vehicle interior display information were displayed in the information display area; and
   an elastic member configured to apply an elastic force between the movable body and the drive device, the elastic force being due to the displacement operation of the movable body from the tilted position side to the erect position side.

2. The vehicular display system according to claim 1, wherein
   the elastic member is provided so as to increase the elastic force with increase in an amount of the displacement of the movable body from the erect position toward the tilted position.

3. The vehicular display system according to claim 1, wherein
   the drive device includes a holding body configured to hold the first moving body in a state relatively rotatable about the axis of the first rotary shaft, and
   the elastic member is provided so as to apply the elastic force to the first moving body and the holding body in directions opposite to each other along a circle about the axis of the first rotary shaft.

4. The vehicular display system according to claim 2, wherein
   the drive device includes a holding body configured to hold the first moving body in a state relatively rotatable about the axis of the first rotary shaft, and
   the elastic member is provided so as to apply the elastic force to the first moving body and the holding body in directions opposite to each other along a circle about the axis of the first rotary shaft.

5. The vehicular display system according to claim 1, wherein
   the elastic member is a torsion coil spring.

6. The vehicular display system according to claim 2, wherein
   the elastic member is a torsion coil spring.

7. The vehicular display system according to claim 3, wherein
the elastic member is a torsion coil spring.

8. The vehicular display system according to claim 4, wherein
the elastic member is a torsion coil spring.

\* \* \* \* \*